United States Patent
Matsumoto

(10) Patent No.: US 6,928,033 B2
(45) Date of Patent: Aug. 9, 2005

(54) MAGNETO-OPTICAL RECORDING MEDIUM HAVING A PLURALITY OF HEAT-RADIATION FILMS

(75) Inventor: Koji Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 218 days.

(21) Appl. No.: 09/994,226

(22) Filed: Nov. 26, 2001

(65) Prior Publication Data

US 2002/0177011 A1 Nov. 28, 2002

(30) Foreign Application Priority Data

May 23, 2001 (JP) .......................................... 2001-154309

(51) Int. Cl.$^7$ ............................................... G11B 11/00
(52) U.S. Cl. ..................................... 369/13.38; 428/64.3
(58) Field of Search ........................... 365/122; 360/59; 369/13.38, 13.35, 13.4, 13.39; 428/69.3, 694 ML, 694 SC

(56) References Cited

U.S. PATENT DOCUMENTS

| | | | | |
|---|---|---|---|---|
| 5,631,056 A | * | 5/1997 | Kawanishi et al. | ........ 428/64.1 |
| 5,796,683 A | * | 8/1998 | Sumi et al. | ............... 369/13.29 |
| 6,296,915 B1 | * | 10/2001 | Yusu et al. | .................. 369/288 |
| 6,456,586 B1 | * | 9/2002 | Suzuki et al. | ................ 369/286 |

FOREIGN PATENT DOCUMENTS

| | | | | | |
|---|---|---|---|---|---|
| JP | 3-105724 A | * | 5/1991 | ............... | 369/13.38 |
| JP | 3-263634 A | * | 11/1991 | ............... | 369/13.38 |
| JP | 11-126387 A | * | 5/1999 | ............... | 369/13.38 |
| JP | 2000-109943 | | 4/2000 | | |
| JP | 2000-285517 | | 10/2000 | | |
| JP | 2001-167484 A | * | 6/2001 | ............... | 369/13.38 |

* cited by examiner

Primary Examiner—Tan Dinh
(74) Attorney, Agent, or Firm—Greer, Burns & Crain, Ltd.

(57) ABSTRACT

A magneto-optical recording medium includes a heat-radiation film and a magnetic film exhibiting magnetic anisotropy in a direction vertical to a surface of the magnetic film. The heat-radiation film is formed between a substrate and the magnetic film and is formed of a plurality of alloy films having different thermal conductivities.

10 Claims, 4 Drawing Sheets

FIG. 3

| MEDIA | FIRST HEAT RADIATION FILM AlCr | SECOND HEAT RADIATION FILM NiP | CNR ||
|---|---|---|---|---|
| | | | MARK LENGTH=0.2 μm | MARK LENGTH=0.15 μm |
| H | 100nm | 0nm | 43.0dB | 40.0dB |
| I | 90nm | 10nm | 45.0dB | 43.0dB |
| J | 80nm | 20nm | 44.6dB | 42.8dB |
| K | 60nm | 40nm | 43.8dB | 41.9dB |
| L | 40nm | 60nm | 42.3dB | 39.1dB |

MAGNETO-OPTICAL RECORDING MEDIUM HAVING A PLURALITY OF HEAT-RADIATION FILMS

CROSS-REFERENCE TO RELATED APPLICATION

This application is related to Japanese Patent Application No. 2001-154309 filed on May 23, 2001, whose priority is claimed under 35 USC §119, the disclosure of which is incorporated by reference in its entirety.

BACKGROUND OF THE INVENTION

1. Field of the Invention

The present invention relates to a magneto-optical recording medium such as a magneto-optical disk. It relates particularly to a magnet-optical recording medium for recording data thereon and reproducing data therefrom by application of laser light and magnetic field utilizing a magneto-optical effect.

2. Description of Related Art

In some prior-art magneto-optical recording media, data is recorded on a magnetic film by applying a laser beam from a substrate side, and the data recorded on the magnetic film is reproduced by applying a laser beam from the substrate side. For example, as shown in FIG. 4, a medium is comprised of a dielectric film 52 (of SiN), a magnetic film 53 (of TbFeCo), a dielectric film 54 (of SiN) and a heat radiation film 55 (of AlCr) formed in this order on a substrate 51 (of polycarbonate). A laser beam 61 is converged through an object lens 62 above the substrate 51 and applied onto the medium.

In this case, since the heat radiation film 55 is composed of a monolayer film and does not intervene between the substrate 51 and the magnetic layer 53, the physical structure of the heat radiation film 55 does not affect the reproduction of data from the magnetic film 53 directly.

On the other hand, there are prior-art magneto-optical recording medium which are irradiated with a laser beam from a side opposite to the substrate. These media are called first surface recording medium. FIG. 5 shows the construction of a prior-art recording medium of this type.

The first surface recording medium is composed, for example, of a heat-radiation film 55 (of AlCr), a dielectric film 54 (of SiN), a magnetic film 53 (of TbFeCo) and a dielectric film 52 (of SiN) formed on a substrate 51 (of polycarbonate) in this order. The heat radiation film 55 of this medium is also formed of a monolayer film, for which not only AlCr but also AlTi and Ag-containing alloys such as AgCuPd and the like have been used (see Japanese Unexamined Patent Publication Nos. 2000-109943 and 2000-285517).

In this first surface recording medium, since the heat radiation film 55 is first formed on the substrate 51 and thereafter the dielectric film 54 and the magnetic film 53 are formed, the magnetic characteristics of the magnetic film 53 are greatly affected by depressions and projections on the surface of the heat radiation film 55 underlying the magnetic film 53. Generally, since the heat radiation film 55 contains metal particles, there are formed significantly large depressions and projections on the surface of the heat radiation film 55, which are undesirable for the magnetic characteristics.

Therefore, the magnetic film 53 formed in the heat radiation film 55 also has depressions and projections, which results in an irregular magnetization direction. Preferably, the magnetization direction is as uniform as possible in a direction vertical to the surface of the film from the viewpoint of coercive force. A medium not having a uniform magnetization direction exhibits only a small coercive force and does not provide desired magnetic characteristics. Especially, the magnetic film cannot be improved in resolution. By simply thickening the heat radiation film for improving heat radiation, desired heat radiation property can be obtained, but the high resolution of the magnetic film cannot be obtained because of existence of large depressions and projections of the heat radiation film.

In order to achieve higher recording and reproducing density as currently required of recording media, the magnetic film needs to have higher resolution. For higher resolution, an S/N ratio (or a CNR) at recording and reproduction is required to increase. The S/N ratio is related to the heat radiation property of the heat radiation film, and in order to improve the S/N ratio, it is necessary to raise the heat radiation, i.e., to raise thermal conductivity.

However, in the prior-art first surface recording medium as shown in FIG. 5, since the heat radiation film is composed of a monolayer film, it is difficult to maintain or improve the heat radiation property and improve the resolution at recording and reproduction at the same time.

SUMMARY OF THE INVENTION

The present invention provides a magneto-optical recording medium including a heat-radiation film and a magnetic film exhibiting magnetic anisotropy in a direction vertical to a surface of the magnetic film, wherein the heat-radiation film is formed between a substrate and the magnetic film and is formed of a plurality of alloy films having different thermal conductivities.

In the present invention, the nearest alloy film to the substrate may have the highest thermal conductivity and the farthest alloy film from the substrate may have the least rough surface.

Thereby, high resolution at recording and at reproduction can be achieved with the desired heat radiation property maintained.

BRIEF DESCRIPTION OF THE DRAWINGS

FIG. 3 is a table showing CNR values of magneto-optical recording media in accordance with Example 5 of the present invention;

DESCRIPTION OF THE PREFERRED EMBODIMENTS

The present invention is a magneto-optical recording medium in which high resolution of a magnetic film can be realized while the medium maintains a desired sufficient heat radiation property by providing a multi-layered heat radiation film.

In this invention, if the heat-radiation film is formed of two alloy films including a first heat-radiation film nearer to the substrate and a second heat-radiation film farther from the substrate, the first heat-radiation film may have a higher thermal conductivity and a larger thickness than the second heat-radiation film.

The first heat-radiation film may be an alloy film containing Al or Ag as a main component. The first heat-radiation film, especially, may be an alloy film containing a predetermined amount of Cr, Si or Ti. The addition of these materials is preferable since they can suppress increase of particle diameter of the main metal component.

The second heat-radiation film may be an alloy film containing Ni as a main component. Here, the second heat-radiation film is an alloy film containing a predetermined amount of a non-magnetic material such as P or Al.

Further, from the viewpoint of achieving a high resolution at recording and reproduction, the second heat-radiation film may be formed on the first heat-radiation film whose surface is flattened by etching.

The present invention provides a process for forming a magneto-optical recording medium including a first dielectric film, a first heat-radiation film, a second heat-radiation film, a second dielectric film, a magnetic film and a third dielectric film formed on a substrate in this order, the process comprising the steps of forming, as the first heat-radiation film, an alloy film having a higher thermal conductivity and a larger thickness than the second heat-radiation film; etching a surface of the first heat-radiation film to flatten the surface; and forming the second heat-radiation film on the flattened surface of the first-radiation film.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention is now described in detail with reference to its embodiment shown in the attached figures, which should not be construed to limit the scope of the invention.

Figure 1:
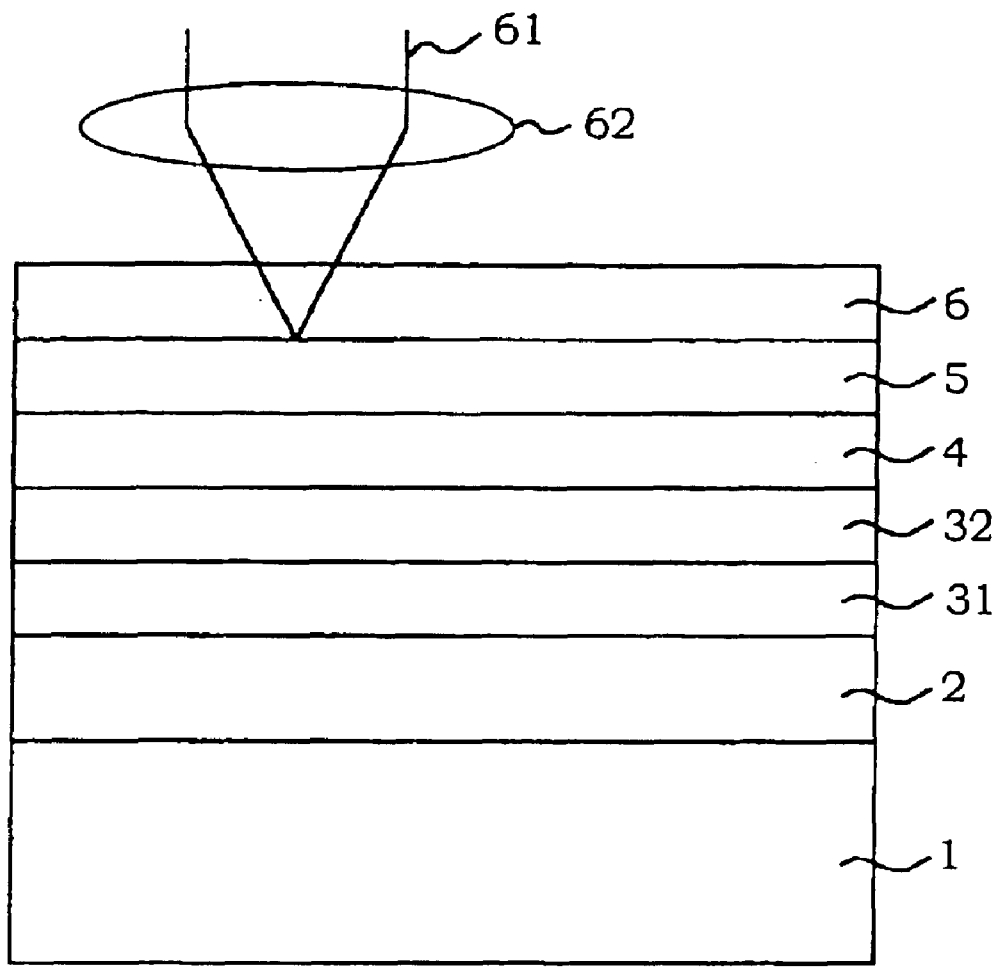
FIG. 1 is a schematic sectional view illustrating the construction of a magneto-optical recording medium in accordance of an example of the present invention.

FIG. 1 is a schematic sectional view illustrating the construction of a magneto-optical recording medium in accordance of an example of the present invention.

The medium of this example includes a first dielectric film 2, a first heat-radiation film 31, a second heat-radiation film 32, a second dielectric film 4, a magnetic film 5 and a third dielectric film 6, which are formed on a substrate 1 in this order.

This medium is a first surface recording medium to which laser light is applied from a third dielectric film side which is opposite to a substrate side. However, the present invention is also applicable to a medium which has a layered structure with a bi-layered heat radiation film such as that of the present invention and which is irradiated with laser light from a substrate side of the medium.

The substrate 1 is formed of polycarbonate and about 1 to 2 mm thick. The first, second and third dielectric films 2, 4 and 6 are formed of SiN and are about 5 nm, 7 nm and 40 nm thick, respectively.

The magnetic film 5 exhibits magnetic anisotropy in a direction vertical to the film surface. For example, the magnetic film 5 is formed of TbFeCo and about 15 nm thick.

The first heat radiation film 31 which is nearer to the substrate 1 is formed of an alloy film having a large thermal conductivity, and the second heat radiation film 32 which is farther from the substrate 1 is formed of an alloy film having a small thermal conductivity.

The alloy film having a large thermal conductivity may be an alloy film containing Al or Ag as a main ingredient. Particular examples thereof include AlCr, AlTi and the like, which are not limitative examples.

The alloy film having a small thermal conductivity may be an alloy film containing Ni as a main ingredient. Particular examples thereof include NiP, NiAl and the like, which are not limitative examples. The second heat radiation film 32 may preferably be formed of an alloy film having only small depressions and projections on its surface even if it has a small thermal conductivity.

In the case where AlCr is used for the first heat radiation film 31, the thickness thereof is about 50 nm. In the case where NiP is used for the second heat radiation film 32, the thickness thereof is about 10 nm.

The reason why the first heat radiation film 31 which is nearer to the substrate is formed of an alloy with a large thermal conductivity is for obtaining as large heat-radiation effect as possible.

The reason why the second heat radiation film 32 with a small thermal conductivity is formed on the first heat radiation film 31 is for allowing the magnetic film 5 formed on these films to have higher resolution. As described above, the alloy film with a small thermal conductivity may be formed of a material containing Ni as a main ingredient. Generally, smaller depressions and projections are formed on an alloy film containing Ni as a main ingredient than on an alloy film which is formed of Al or the like as a main ingredient and has a large thermal conductivity. As a result, the magnetic film 5 formed above the second heat radiation film 32 can have a uniform magnetization direction and can have high resolution.

The reason why the alloy film 31 with a large thermal conductivity is thicker than the alloy film 32 with a small thermal conductivity is for allowing the magnetic film to have high resolution while maintaining a large thermal conductivity for the heat radiation film as a whole.

The thicker the alloy film 31 with a large thermal conductivity, the better heat radiation effect it has. The maximum thickness of the alloy film 31 is restricted by the thickness which the film is designed to have.

If the alloy film 31 with a large thermal conductivity is thicker than the alloy film 32 with a small thermal conductivity, it is possible to achieve high resolution for the magnetic layer. Assuming that W1 represents the thickness of the alloy film 31 and W2 represents the thickness of the alloy film 32, it is preferable to select the values of W1 and W2 to satisfy $W1 \geq W2 > 0$.

In this example, the heat radiation film has two layers. However, this is not a limitative example, and the heat radiation film has a multi-layered structure of three or more layers.

The following is the thermal conductivity of each layer of the medium shown in FIG. 1:

Substrate 1: $2 \times 10^4$ erg/sec·cm·deg

Dielectric films 2,4,6: $1.5 \times 10^5$ erg/sec·cm·deg

Magnetic film 5: $1 \times 10^6$ erg/sec·cm·deg

First heat radiation film 31: $2.4 \times 10^7$ erg/sec·cm·deg

Second heat radiation film 32: $1.2 \times 10^7$ erg/sec·cm·deg.

According to the above, the thermal conductivity of the second heat radiation film 32 is half the thermal conductivity of the first heat radiation film 31.

In the case where the an alloy film of AgCu is used as the first heat radiation film 31, the thermal conductivity thereof is about 3.1×10$^7$ erg/sec·cm·deg. In this case, the thermal conductivity is further enhanced.

Figure 2:
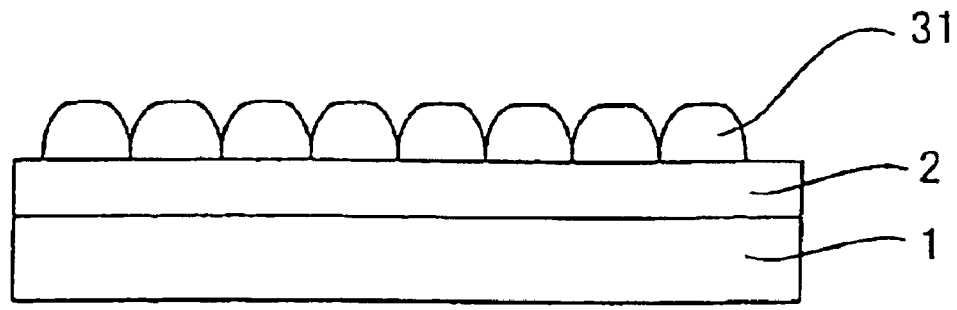
FIGS. 2(a) to 2(c) are schematic sectional views illustrating the profile of a magneto-optical recording medium in accordance of the present invention.
Figure 2:
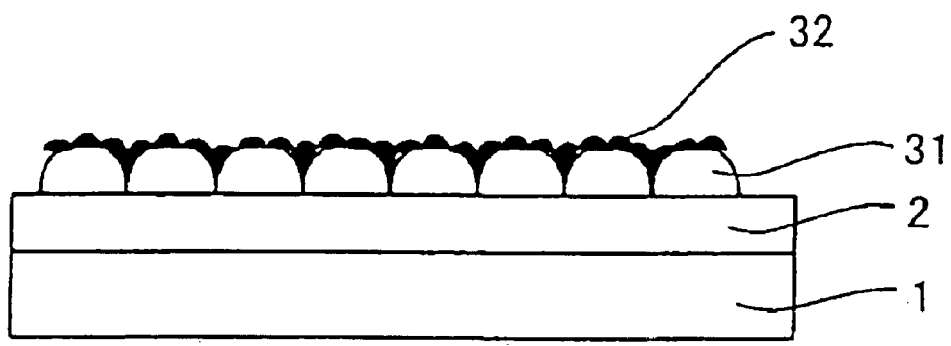
Figure 2:
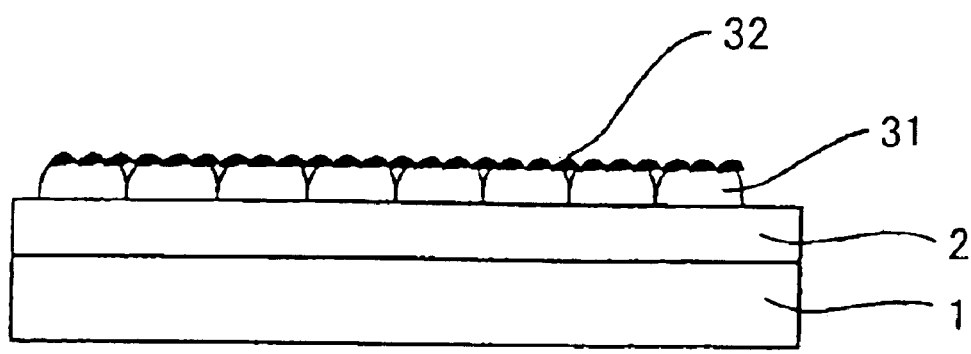
Figure 4:
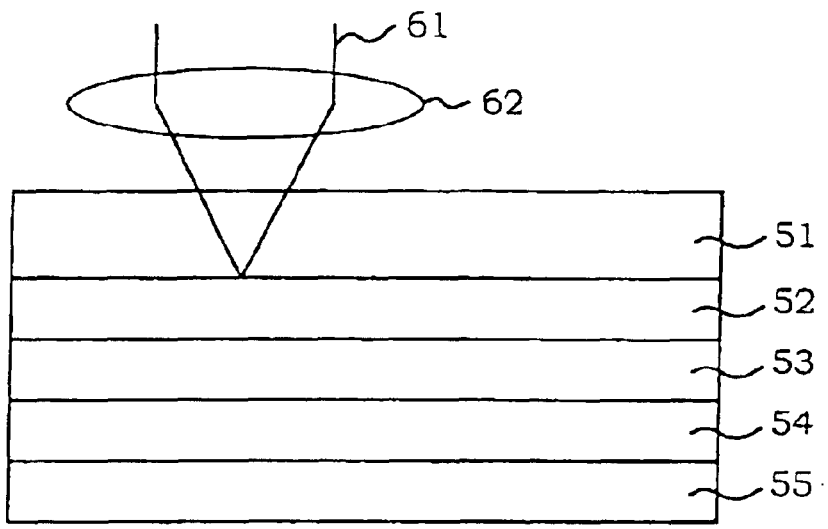
FIG. 4 is a schematic sectional view illustrating the construction of a prior-art magneto-optical recording medium.
Figure 5:
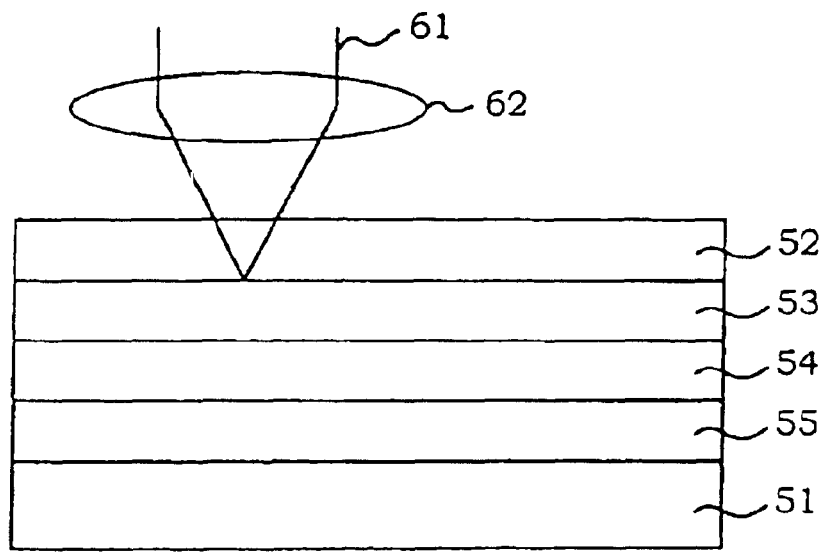
FIG. 5 is a schematic sectional view illustrating the construction of a prior-art magneto-optical recording medium.

FIGS. 2(a) to 2(c) are schematic sectional views illustrating the profile of a magneto-optical recording medium in accordance of the present invention.

FIG. 2(a) shows a cross section when a dielectric film 2 of SiN is formed on a substrate 1 and a first heat radiation film 31 of AlCr is formed thereon.

The AlCr film 31 has depressions and projections with a rather larger period on its surface and the depressions and projections causes the recording resolution of the medium to decline.

For example, without the AlCr film 31, the surface of the SiN film 2 has a mean roughness Ra of 0.3 nm. However, when the AlCr film 31 is formed to a thickness of about 50 nm, the mean roughness Ra is 1.1 nm and the period of depressions and projections is about 40 nm. Further, when the AlCr film 31 is formed to a thickness of about 100 nm, the mean roughness Ra is 1.5 nm and the period of depressions and projections is about 50 nm. If a magnetic film or the like is formed on this AlCr film 31, the required recording resolution may not be obtained.

FIG. 2(b) shows a cross section when a second heat radiation film 32 of NiP is formed on the first heat radiation film 31 of AlCr shown in FIG. 2(a). This NiP film 32 has a small thermal conductivity, but its surface has depressions and projections of a relatively small period. This reduces the effect of the magnetic film on the recording resolution.

For example, when the NiP film 32 is formed to a thickness of about 10 nm on the AlCr film 31, the period of the depressions and projections can be decreased by about 80% as compared with the case where the NiP film is not formed.

Accordingly, it is possible to provide a magneto-optical recording medium having high recording resolution with maintaining high heat radiation by forming a heat radiation film in a multi-layered structure including a first heat radiation film having a relatively good heat radiation effect and a second heat radiation film having depressions and projections with a relatively small period on its surface, the second heat radiation film being formed nearer to a magnetic film.

FIG. 2(c) shows a cross section when the first heat radiation film 31 is partially flattened by etching. As shown in FIG. 2(c), after the first heat radiation film 31 is formed, the surface of the first radiation film 31 is flattened by etching before the second heat radiation film 32 is formed. Then the second heat radiation film 32 is formed on the flattened surface.

According to this, since the resulting surface is less rough as compared with the medium shown in FIG. 2(b), it is possible to produce a medium having high resolution and reduce noise which would be caused by depressions and projections.

Examples of the magneto-optical recording medium of the present invention are now explained.

EXAMPLE 1

As a medium of Example 1, a medium A was formed to have the following film construction. The layered structure were the same as shown in FIG. 1:

Substrate 1: a land/groove substrate of polycarbonate of 3.5 inch diameter and 1.2 mm thickness, a width of lands and grooves of 0.4 μm and a depth of grooves of 35 nm.

First dielectric film 2: a SiN film of 10 nm thickness

First heat radiation film 31: an AlCr film of 90 nm thickness

Second heat radiation film 32: a NiP film of 10 nm thickness

Second dielectric film 4: a SiN film of 10 nm thickness

Magnetic film 5: a TbFeCo film of 20 nm thickness

Third dielectric film 6: a SiN film of 40 nm thickness.

A laser wavelength of 400 nm was used for recording and reproduction, NA of an object lens was 0.6, and laser light was applied from a third dielectric film side, which was opposite to the substrate 1. Accordingly, this medium was a first-surface recording medium.

The films were formed on the substrate 1 using a DC magnetron sputtering apparatus. An Ar gas and an Ar+N$_2$ gas were used for sputtering the magnetic film 5 and the dielectric films 2, 4 and 6, respectively.

The films were formed using the following targets and film forming conditions:

For the dielectric films 2, 4 and 6, B-doped Si was used, an applied power was 0.8 kw, and a sputtering gas pressure was 0.3 Pa.

For the first heat radiation film 31 of AlCr, Al98Cr2 (the numerals represent atomic %) was used, the applied power was 0.8 kw, and the sputtering gas pressure was 0.5 Pa.

For the second heat radiation film 32 of NiP, Ni75P25 (the numerals represent atomic %) was used, the applied power was 0.8 kw, and the sputtering gas pressure was 0.5 Pa.

For the magnetic film 5, Tb21Fe65Co14 (the numerals represent atomic %) was used, Hc was 12 kOe, and Ms was 50 emu/cc.

For comparison with the above medium A of the present invention, a conventional medium B was formed which has a single layered film as a heat radiation film.

In the conventional medium B, an AlCr film of 100 nm thickness was formed as a heat radiation film 3, and the other layers 2, 4, 5 and 6 were formed to have the same construction as in the medium A of the present invention.

A mark of 0.2 μm length and of 0.4 μm period was recorded on these media A and B and reproduced by applying laser light to measure a CNR (carrier-to-noise ratio) at reproduction.

The linear velocity of the media at recording and at reproduction was 4 m/s, a recording power was 5.4 mw, and a reproducing power was 2.3 mW.

The CNR of the conventional medium B was 43 dB, while the CNR of the medium A of Example 1 of the present invention was 45 dB. Thus the medium A of Example 1 had an improved recording resolution.

When a mark of 0.15 μm length and of 0.3 μm period, which was shorter than the above mark, was recorded, the CNR of the conventional medium B was 40 dB, while the CNR of the medium A of Example 1 was 43 dB. Thus the medium A also had an improved recording resolution.

As discussed above, according to Example 1, since the heat radiation film is composed of the two films different in properties, it is possible to improve the resolution of magnetic film while maintaining the heat radiation characteristics.

EXAMPLE 2

Next, explanation is given of a medium wherein, after being formed, a first heat radiation film (AlCr) 31 was etched, as shown in FIG. 2(C).

In this Example 2, the first heat radiation film (AlCr) 31 was formed to a thickness of 110 nm under the same conditions as described in Example 1. Then the first heat radiation film 31 was etched. Then a second heat radiation film (NiP) 32 was formed in the same manner as described in Example 1. Thus a bi-layered heat radiation film was formed. The medium of Example 2 is referred to as medium C.

Here, the first heat radiation film 31 may be etched, for example, by RF etching. In Example 2, the first heat radiation film 31 was etched to a thickness of about 90 nm by RF etching using Ar as an etching gas at an applied power of 500W, an etching gas pressure of 1.0 Pa for an etching time of 15 minutes.

Accordingly, the medium C had the same film construction as shown in FIG. 1 and Example 1, but the surface of the first heat radiation film 31 was flattened by etching and the heat radiation film as a whole had a smoother surface. In this respect, Example 2 was different from Example 1.

The observation through an AFM (Atomic-Force-Microscope) showed that the surface of the medium A of Example 1 had an Ra of 1.4 nm and a depression-projection period of 45 nm after the second heat radiation film 32 was formed.

On the other hand, the surface of the medium C of Example 2 had an Ra of 0.3 nm and a depression-projection period of 120 nm after the first radiation film (AlCr) 31 was formed and had an Ra of 0.6 nm and a depression-projection period of 23 nm after the second heat radiation film (NiP) 32 was formed. As compared with Example 1, the medium C of Example 2 had a smoother surface with a smaller depression-projection period.

The CNR of the medium C of Example 2, measured under the same conditions as in Example 1, was 46 dB when the mark length was 0.2 $\mu$m and 44.5 dB when the mark length was 0.15 $\mu$m.

Since the CNR of Example 1 was 45 dB and 43 dB at the mark lengths of 0.2 $\mu$m and 0.15 $\mu$m, respectively, it is understood that Example 2 had an improved recording resolution at both the mark lengths.

In the medium C of Example 2, the surface of the heat radiation film was rendered smoother, so that noise reflecting depressions and projections was reduced. Thereby it is considered that the CNR was improved.

As discussed above, according to Example 2 of the present invention, since the surface of the heat radiation film is smoothened by etching the first heat radiation film, it is possible to improve the CNR by noise reduction and therefore to realize higher resolution of the magnetic film.

EXAMPLE 3

In this example, other materials having a high thermal conductivity were used for the first heat radiation film 31 in place of AlCr.

The film construction of media was the same as shown in FIG. 1 and Example 1. A medium D was produced with use of Al98Ti2 (the numerals represent atomic %, the same in the following passages) for the first heat radiation film 31, and a medium E was produced with use of Ag98Cu1Pd1 for the first heat radiation film 31. In both the cases, the first heat radiation films were formed to a thickness of about 90 nm in the same manner as in Example 1.

The thermal conductivity of Al98Ti2 is 2.4 erg/sec·cm·deg, and that of Ag98Cu1Pd1 is 3.1 erg/sec·cm·deg.

The CNR of the two media was measured in the same manner as in Example 1 to obtain the following results:

The CNR of the medium D was 44.8 dB when the mark length was 0.2 $\mu$m and 43.1 dB when the mark length was 0.15 $\mu$m.

The CNR of the medium E was 45.3 dB when the mark length was 0.2 $\mu$m and 43.2 dB when the mark length was 0.15 $\mu$m.

According to Example 3, in either the case of using an AlTi alloy film containing Al as a major ingredient or the case of using a AgCuPd alloy film containing Ag as a major ingredient as the first heat radiation film 31, good CNRs can be obtained as in the case of the medium A of Example 1. Therefore, it is possible to produce a magneto-optical recording medium having high recording resolution while keeping a high heat radiation property.

EXAMPLE 4

In Example 1 and the above examples, Ni75P25 was used for the second heat radiation film 32 having a small thermal conductivity. In this example, explanation is given of the cases of using Ni80P20 (medium F) and Ni75Al25 (medium G) instead.

The film construction and the method of forming films were the same as in FIG. 1 and Example 1.

The following is the CNR of media F and G with AlTi or AgCuPd used as the first heat radiation film 31.

When the first heat radiation film 31 was formed of AlTi and the second heat radiation film 32 was formed of Ni80P20, the CNR was 44.9 dB when the mark length was 0.2 $\mu$m and 43.0 dB when the mark length was 0.15 $\mu$m. When the first heat radiation film 31 was formed of AlTi and the second heat radiation film 32 was formed of Ni75Al25, the CNR was 45.1 dB when the mark length was 0.2 $\mu$m and 42.8 dB when the mark length was 0.15 $\mu$m.

When the first heat radiation film 31 was formed of AgCuPd and the second heat radiation film 32 was formed of Ni80P20, the CNR was 45.4 dB when the mark length was 0.2 $\mu$m and 43.3 dB when the mark length was 0.15 $\mu$m. When the first heat radiation film 31 was formed of AgCuPd and the second heat radiation film 32 was formed of Ni75Al25, the CNR was 45.2 dB when the mark length was 0.2 $\mu$m and 43.4 dB when the mark length was 0.15 $\mu$m.

Thus, the media F and G of Example 3 whose second heat radiation films had different compositions from the heat radiation film of Example 1, also had a CNR of 45 dB or more at the mark length of 0.2 $\mu$m and a CNR of 43 dB or more at the mark length of 0.15 $\mu$m, similarly to the medium of Example 1. It is understood that higher resolution than in the conventional medium can be realized.

EXAMPLE 5

Here, explanation is given of a change in the CNR as the thickness of the first and second heat radiation films 31 and 32 is changed.

Five types of media H, I, J, K and L were produced using Al98Cr2 and Ni75P25 as the first heat radiation film 31 and the second heat radiation film 32, respectively. The thickness of the films 31 and 32 was changed with the total thickness maintained at 100 nm.

FIG. 3 shows the results of measurement of the CNR of the five media in Example 5.

FIG. 3 shows that the CNR becomes lower as the first heat radiation film 31 (AlCr) was thinner and the second heat radiation film (NiP) 32 was thicker.

It is considered that, as the first heat radiation film 31 with a high thermal conductivity was thinner, the thermal conductivity, i.e., heat radiation, of the medium worsens, heat was more liable to accumulate at recording and the CNR declined. The medium L which had a second heat radiation film 32 thicker than a first radiation film 31, especially, had a CNR inferior to the conventional medium B.

Therefore, in order to improve the CNR as compared with the conventional medium whose heat radiation film is formed of a single layer, it is preferable at least that the first heat radiation film 31 is thicker than the second heat radiation film 32.

In the above examples, the heat radiation film is composed of two layers. However, high resolution can also be realized by a medium in which the heat radiation film is composed of three or more layers, for example, the heat radiation film is composed of films of AlSiCr, AgCuPd and NiP formed on the substrate in this order. In this case, the closest heat radiation film to the substrate preferably has the highest thermal conductivity. Further, the farthest heat radiation film from the substrate preferably has the smoothest surface.

According to the present invention, since the heat radiation film is composed of a plurality of alloy films with different thermal conductivities, it is possible to provide a magneto-optical recording medium whose magnetic film has an improved resolution with maintaining a high heat radiation property.

What is claimed is:

1. A magneto-optical recording medium comprising:
   a heat-radiation film; and
   a magnetic film exhibiting magnetic anisotropy in a direction vertical to a surface of the magnetic film,
   wherein the heat-radiation film is formed between a substrate and the magnetic film and is formed of a plurality of alloy films having different thermal conductivities.

2. A magneto-optical recording medium comprising:
   a heat-radiation film; and
   a magnetic film exhibiting magnetic anisotropy in a direction vertical to a surface of the magnetic film,
   wherein the heat-radiation film is formed between a substrate and the magnetic film and is formed of a plurality of alloy films having different thermal conductivities, and of the alloy films, the nearest one to the substrate has the highest thermal conductivity and the farthest one from the substrate has the least rough surface.

3. The magneto-optical recording medium according to claim 2, wherein the heat-radiation film is formed of two alloy films including a first heat-radiation film nearer to the substrate and a second heat-radiation film farther from the substrate, and the first heat-radiation film has a higher thermal conductivity and a larger thickness than the second heat-radiation film.

4. The magneto-optical recording medium according to claim 3, wherein the first heat-radiation film is an alloy film containing Al or Ag as a main component.

5. The magneto-optical recording medium according to claim 4, wherein the first heat-radiation film is an alloy film containing a predetermined amount of Cr, Si or Ti.

6. The magneto-optical recording medium according to any one of claims 3, 4 and 5, wherein the second heat-radiation film is an alloy film containing Ni as a main component.

7. The magneto-optical recording medium according to claim 6, wherein the second heat-radiation film is an alloy film containing a predetermined amount of P or Al.

8. The magneto-optical recording medium according to claim 3, wherein the second heat-radiation film is formed on the first heat-radiation film whose surface is flattened by etching.

9. A process for forming a magneto-optical recording medium including a first dielectric film, a first heat-radiation film, a second heat-radiation film, a second dielectric film, a magnetic film and a third dielectric film formed on a substrate in this order, the process comprising the steps of:
   forming, as the first heat-radiation film, an alloy film having a higher thermal conductivity and a larger thickness than the second heat-radiation film;
   etching a surface of the first heat-radiation film to flatten the surface; and
   forming the second heat-radiation film on the flattened surface of the first-radiation film.

10. The magneto-optical recording medium according to claim 1, wherein data is recorded on and reproduced from the magneto-optical recording medium by applying light on a side of the magneto-optical recording medium opposite from the substrate.

* * * * *